(12) United States Patent
Najafi et al.

(10) Patent No.: US 10,250,235 B2
(45) Date of Patent: Apr. 2, 2019

(54) FULL-WAVE CHARGE PUMP WITH LOW-VOLTAGE STARTUP

(71) Applicant: THE REGENTS OF THE UNIVERSITY OF MICHIGAN, Ann Arbor, MI (US)

(72) Inventors: Khalil Najafi, Ann Arbor, MI (US); Rebecca L. Peterson, Ann Arbor, MI (US); James John McCullagh, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 105 days.

(21) Appl. No.: 15/364,653

(22) Filed: Nov. 30, 2016

(65) Prior Publication Data
US 2017/0155379 A1 Jun. 1, 2017

Related U.S. Application Data

(60) Provisional application No. 62/260,846, filed on Nov. 30, 2015.

(51) Int. Cl.
*G05F 1/10* (2006.01)
*G05F 3/02* (2006.01)
(Continued)

(52) U.S. Cl.
CPC ............. *H03K 3/012* (2013.01); *H02M 3/07* (2013.01)

(58) Field of Classification Search
CPC .. H02M 3/073; H02M 3/07; H02M 2003/077; G11C 5/145; G05F 3/205
(Continued)

(56) References Cited

U.S. PATENT DOCUMENTS 5,982,647 A * 11/1999 Martin ................ G06K 7/0008
363/59
6,429,635 B2 * 8/2002 Okubo .................... H02M 3/07
323/271
(Continued)

OTHER PUBLICATIONS

Shuo et al., "A voltage-multiplying self-powered ac/dc converter with 0.35 v minimum input voltage for energy harvesting applications" Journal: IEEE Transactions on Power Electronics, vol. 26, Issue 9 pp. 2542-2549 (2011).
(Continued)

*Primary Examiner* — Anh Q Tra
(74) *Attorney, Agent, or Firm* — Harness, Dickey & Pierce, P.L.C.

(57) ABSTRACT

A charge pump with low-voltage startup is presented. The charge pump circuit is comprised of transistor pairs arranged in stages, where the charge pump circuit is configured to receive an input voltage and generate an output voltage whose magnitude is larger than magnitude of the input voltage. An energy storage device is configured to receive and store voltage from the charge pump circuit. A switching circuit is interfaced with the control terminals of the transistors in the charge pump circuit. In response to leakage current through the transistors in the charge pump circuit, the switching circuit switches on select transistors in the charge pump circuit while voltage stored by the energy storage device is below threshold voltage of the transistors in the charge pump circuit.

18 Claims, 12 Drawing Sheets

(51) Int. Cl.
*H03K 3/012* (2006.01)
*H02M 3/07* (2006.01)

(58) Field of Classification Search
USPC ...................................... 327/536; 363/59–60
See application file for complete search history.

(56) References Cited

U.S. PATENT DOCUMENTS

| | | | | |
|---|---|---|---|---|
| 7,084,605 | B2* | 8/2006 | Mickle | H01M 10/44 |
| | | | | 320/101 |
| 8,743,577 | B2 | 6/2014 | Cheng et al. | |
| 8,749,301 | B2* | 6/2014 | Lin | H03K 5/153 |
| | | | | 327/536 |
| 2006/0170461 | A1* | 8/2006 | Bhattacharya | H03K 5/12 |
| | | | | 327/65 |
| 2008/0157734 | A1* | 7/2008 | Feng | H02M 3/07 |
| | | | | 323/271 |
| 2008/0218250 | A1* | 9/2008 | Kimura | H02M 3/07 |
| | | | | 327/536 |
| 2013/0229841 | A1* | 9/2013 | Giuliano | H02M 3/07 |
| | | | | 363/60 |

OTHER PUBLICATIONS

Rahimi et al "A vibration-based electromagnetic energy harvester system with highly efficient interface electronics" Journal: IEEE Transducers, pp. 2650-2653 (2011).

Rahimi et al "An interface circuit prototype for a vibration-based electromagnetic energy harvester" Journal: International Conference on Energy Aware Computing, pp. 1-4 (2010).

* cited by examiner

FULL-WAVE CHARGE PUMP WITH LOW-VOLTAGE STARTUP

CROSS-REFERENCE TO RELATED APPLICATIONS

This application claims the benefit of U.S. Provisional Application No. 62/260,846, filed on Nov. 30, 2015. The entire disclosure of the above application is incorporated herein by reference.

GOVERNMENT CLAUSE

This invention was made with government support under 70NANB9H9008 awarded by the National Institute of Standards and Technology. The Government has certain rights in this invention.

FIELD

The present disclosure relates to charge pumps and, in particular, a charge pump arrangement with low-voltage startup.

BACKGROUND

Harvesting energy in every possible environment requires innovative harvesting methods and circuit interfaces. For example, sensors can analyze a bridge's structural integrity. However, underneath a large suspension bridge battery replacement proves difficult and solar power can be unavailable. A combination of radio frequency (RF), thermal, and vibration harvesting can power these sensors in every location. The type of harvester determines the methods used in the interface circuit. A thermal harvester's DC output allows DC-DC start-up techniques not possible with an AC output. Similarly, an RF harvester's high frequency (~MHz) very low power (~nW) AC output can allow techniques not possible with a vibration harvester's low frequency (<500 Hz) low power (>1 μW) output. Even piezoelectric vibration harvester's capacitive element motivates different interface circuits vs. electromagnetic harvesters.

While these harvester outputs are different, they present similar challenges. One low voltage low power AC or DC harvester output must frequently cold start-up the interface circuit. The harvester must also supply nA-A of current to a load at a specific voltage. This may require boosting and must be done without transformers or a pre-charged supply. For example, a Cockcroft-Walton (CW) charge pump allows frequent start-up. This charge pump has an AC input and a DC reference. The charge pump boosts from the DC reference voltage to an output storage voltage ($V_{Store}$). The switches that boost the charge pump can be passive diodes in either direction or active NMOS or PMOS diodes/switches. The active switches would need a DC power supply to generate a switching signal at their gates. Both MOSFETS and diodes have a technology dependent voltage that must be overcome to allow significant charge flow. In MOSFETs, this is called the threshold voltage (Vth). The transistor and diode threshold voltages limit the minimum input voltage required to turn-on the harvester. This disclosure focuses on reducing the harvester turn-on voltage.

Advances in wireless sensors and microprocessors have reduced power and voltage requirements. Some sensors require <6 nWs; however, low-power microprocessors may still require ~300 μW at ~1.8 V. These requirements determine the harvesting method and storage requirements. For example, an on-chip battery or capacitor may be sufficient to supply ~nW sensors, but a microprocessor requires off-chip storage (e.g. a ~100 μF capacitor). External storage is necessary because the harvested output can be and power limited (~5-10 μW); nevertheless the power supply must be stable. The proposed charge pump could be part of a wireless multi-harvester system used to supply a microprocessor regularly in sleep mode. Here an IC allows the use of design techniques and technology characteristics, unavailable in discrete electronics to meet a system's requirements.

RF and vibration harvester circuits are both designed to overcome diode drops in rectifiers and charge pumps. However, low voltage start-up (~200 mV) remains a challenge. High frequency (~Mhz) very low power (~nA) RF harvester outputs can readily be boosted and rectified as seen in FIG. 1A. This is because the diode turn-on voltage reduces by ~100 mV for every decade of current from ~μA to ~nA. In fact, analysis shows that a diode's turn-on plays no role when harvesting deep sub-threshold current for a ~nF load. Sensitivity in dBm can be used as a metric for RF circuits instead of efficiency. A charge pump and ~nF-~pF capacitive load is the primary option for high frequency very low power RF inputs.

Larger capacitive (~μFs) loads will not charge from ~nA current due to high leakage. Therefore, turn-on voltages remain an obstacle when charging >1 μF loads in RF harvesting. Zero-threshold diodes have limited effectiveness due to leakage. Floating gate capacitors reduce turn-on voltages when using a 10 μF load. However, the charge on these floating gate capacitors cannot be maintained for long-term bridge harvesting motivating new solutions.

Higher power DC-DC harvesting circuit research often focuses on power tracking, multi-harvester systems, or both. In thermal harvesting circuits, boosting is often required, but rectification is not required as seen in FIG. 1B. In most cases, to boost a low voltage DC output, it is necessary to generate a clock. The power source for this clock can be either an external source or the DC harvester input. This clock is then used to switch the MOSFETS in a charge pump or to provide a clock with the correct duty cycle for an LC boost converter. Both architectures can also be used together. Low-voltage duty cycle and LC converter control is difficult, so alternative start-up methods are required.

These alternative methods include the use of a transformer, external switch, pre-charged supply, external clock, sub-Hz trigger, or charge pump. On-chip charge pumps can boost using a clock created from a low DC voltage (~95-330 mV). Similar to RF research, these charge pump thermal harvesting circuits start-up charging ~pF-nF capacitors to reduce a switch's turn-on voltage. After >0.1 s with a DC input, this circuit transitions to a high current load, such as a 100 μF capacitor or small resistor. For a ~100 Hz AC input, where rectification is required, this method for turn-on voltage reduction in a switch or diode is not an option to charge >1 μF loads from start-up.

The type of vibration harvester (e.g. piezoelectric vs. electromagnetic) determines the interface circuit architecture and challenges. Piezoelectric harvesters have a capacitive element that can be manipulated for higher efficiency. They tend to have a higher voltage output and use a buck converter. Charge pumps can also be used with low voltage piezoelectric harvesters. An inductor in these charge pumps optimizes matching with the piezoelectric harvester and its capacitive element.

Broadband vibration harvesters capture energy from a range of frequencies. One approach is to simultaneously rectify multiple frequencies from a piezoelectric disk.

Another approach is to tune a harvester's resonant frequency, but this consumes too much power. An electromagnetic parametric frequency increased generator (PFIG) can harvest broadband frequencies and accelerations on a bridge (e.g. 30-100 mg (1 g=9.81 m/s2) between 1-30 Hz). It uses mechanical frequency up-conversion. A large mass snaps back and forth between latching magnets on two springs. When the mass is released, each springs oscillates at an up-converted frequency. A power generation magnet on top of each spring produces a decaying voltage when it oscillates between a copper coil. The decaying sine-wave voltage oscillating at ~100 Hz has peak open circuit outputs decreasing from ~450 to ~200 mV with a 200-300Ω output impedance. In a year-long bridge study, a single FIG output regularly exceeded 10 μW for ~20 seconds. Nights and weekends generated little power, emphasizing the need for circuit start-up.

Half-wave CW charge pumps can be used as building blocks to boost an interface circuit's output. The charge pump both boosts and rectifies as seen in FIG. 1C. Previous PFIG interface circuits used half-wave CW charge pumps made from off-chip capacitors (>1 μF) with and without transformers. Charge pumps enable boosting and start-up as the input is harvested. At the same time, the input is used as a clock to switch the diodes. A transformer can be added between a harvester and a charge pump as seen in FIG. 2A. The transformer boosts the harvester's output to overcome the charge pump's diode drops. Two half-wave CW charge pumps, each with its own input, can be added to produce a high voltage by connecting one charge pump's output to the next charge pump's DC reference as seen in FIG. 2B. A half-wave CW charge pump only harvests either positive or negative voltages depending on the diodes' orientation. However, a full-wave charge pump, with only one input, can be created with two half-wave CW charge pumps as seen in FIG. 2C. The two charge pumps' DC references are connected together, and one charge pump harvests positive voltages, while the other harvests negative voltages. A common ground for a multi-harvester system can be used by connecting the bottom charge pump output to ground.

The PFIG's passive charge pumps used Schottky diodes with a ~180 mV turn-on voltage, Vdiode-drop. The maximum voltage, $V_{out}CW$, of a single n-stage CW charge pump to rectify and boost a decaying sine-wave with peak voltage, Vpeak, is $$V\_outCW = 2 \times n \times (V\_Peak - V\_(diode\text{-}drop)). \quad (1)$$

With a 180 mV Vdiode-drop, the PFIG's low voltage ~220 mV output gives a maximum circuit output voltage of <0.5 V (6 stages), with low efficiency (5-10%). Schottky diodes have also been used to create a supply with a dual output harvester. One harvester output creates a supply while the other output is actively harvested. However, this means only one of two outputs is harvested.

Transformers boost a harvester's AC signal to overcome diode drops. For a transformer matched to the harvester's impedance, the maximum charge pump output is $$V\_CW = 2 \times n \times ([T\_Boost/2 \times V] \_Peak - V\_(diode\text{-}drop)). \quad (2)$$

TBoost is the transformer's boost ratio. When matched to a low impedance (~3-4Ω), electromagnetic interface circuits produce high efficiencies (~65%). However, circuits that interface to a high impedance (~300Ω) low frequency FIG output have reduced efficiency (~38%). This is due, in part, to the matched transformer's increased DC resistance and decreased inductive coupling. Also, a harvester designed to match to a transformer may be power limited.

Several circuit techniques reduce turn-on voltage for vibration harvesters. A passive negative voltage converter (NVC), similar to a gate-cross-coupled rectifier, converts the negative portion of the input positive for use in a half-wave rectifier. Once the NVC's input overcomes the technology's Vth, its voltage drop is ~0 V. However, start-up voltage is still Vth dependent (0.35 μm CMOS) at ~380 mV. Similar to RF circuits, passive low voltage (~150 mV) sub-threshold charging of on-chip ~pF-nF capacitors is also possible with vibration harvesters. This storage is not suitable for many applications though.

Active AC-DC solutions to boost and rectify improve efficiency, but they have difficulty with cold start-up and low voltage operation similar to DC-DC LC boost converters. Active fully integrated switched capacitor/charge pump ICs have been built that boost vibration harvester outputs, but they need a 0.8 V pre-charged supply to generate a clock. Rectifier-free AC-DC LC solutions still need a pre-charged supply. AC-DC LC boost converters don't always need a clock or pre-charge supply for start-up, but they still need to rectify and this rectification still depends on the diode's turn-on voltage.

Passive charge pumps can start-up between 0.44-0.5 V. Single and multiple stage discrete active diode charge pumps have been built for vibration harvesters using 100-200 μF capacitors. The large capacitors are needed to optimize efficiency by not limiting current. The bulk-connections of the discrete transistors form passive diodes for start-up. Well characterized efficiencies exceed 70% for higher power inputs at <1 kHz. With a comparator for every active diode, power consumption is ~6 μW.

This section provides background information related to the present disclosure which is not necessarily prior art.

SUMMARY

This section provides a general summary of the disclosure, and is not a comprehensive disclosure of its full scope or all of its features.

A charge pump with low-voltage startup is presented. The charge pump includes a charge pump circuit, a switching circuit and an energy storage device, such as a capacitor. The charge pump circuit is comprised of transistor pairs arranged in stages and more particularly the charge pump circuit has a Cockcroft-Walton arrangement. The charge pump circuit is configured to receive an input voltage and generate a DC output voltage whose magnitude is larger than magnitude of the input voltage. The energy storage device is configured to receive and store voltage from the charge pump circuit. The switching circuit is interfaced with control terminals of the transistors in the charge pump circuit.

In response to leakage current through the transistors in the charge pump circuit resulting from an input voltage to the charge pump circuit, the switching circuit switches on and off the transistors in the charge pump circuit while voltage stored by the energy storage device is below the threshold voltage of the transistors in the charge pump circuit.

While the voltage stored by the energy storage device is above the threshold voltage of the transistors in the charge pump circuit, the switching circuit is powered by voltage stored by the energy storage device and switches on and off the transistors in the charge pump circuit.

In one aspect, the charge pump circuit is comprised of two half-wave charge pumps electrically coupled together, such that output of one half-wave charge pump is a DC reference voltage for the other half-wave charge pump.

Additionally, the switching circuit further includes a first comparator configured to receive and compare an input to a stage having lowest voltage of the charge pump circuit with an output of the stage having the lowest voltage of the charge pump circuit, and a second comparator configured to receive and compare an input to the stage having lowest voltage of the charge pump circuit with ground. The switching circuit also includes a first string of inverters coupled between an output of the first comparator and select control terminals of the transistors, and a second string of inverters coupled between an output of the second comparator and select control terminals of the transistors. A resistor-capacitor circuit may also be electrically coupled between the output of the stage having the lowest voltage of the charge pump circuit.

The charge pump may further include a mode selector interposed between the energy storage component and the charge pump circuit. The mode selector prevents current flow to the energy storage component while the DC output voltage of the charge pump circuit is below a specific value and permits current flow to the energy storage component while the DC output voltage of the charge pump circuit is above the same specific value. Typically, the specific voltage value is chosen to be close to the transistor threshold voltage.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 9A:
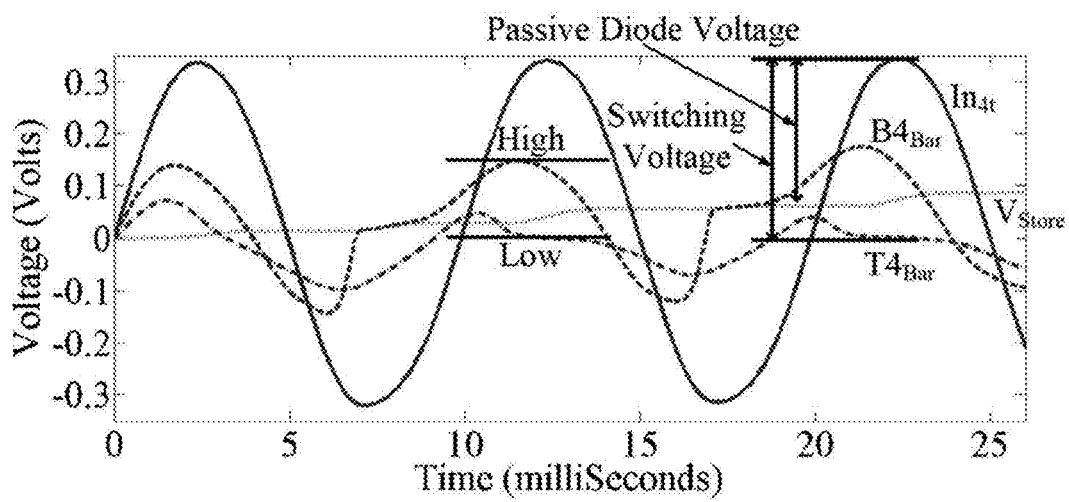
Figure 9B:
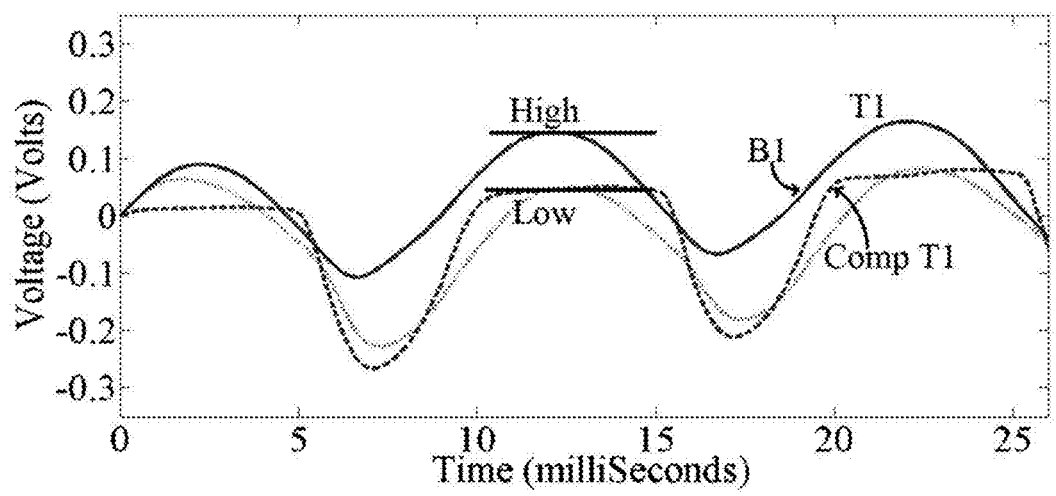
Figure 9C:
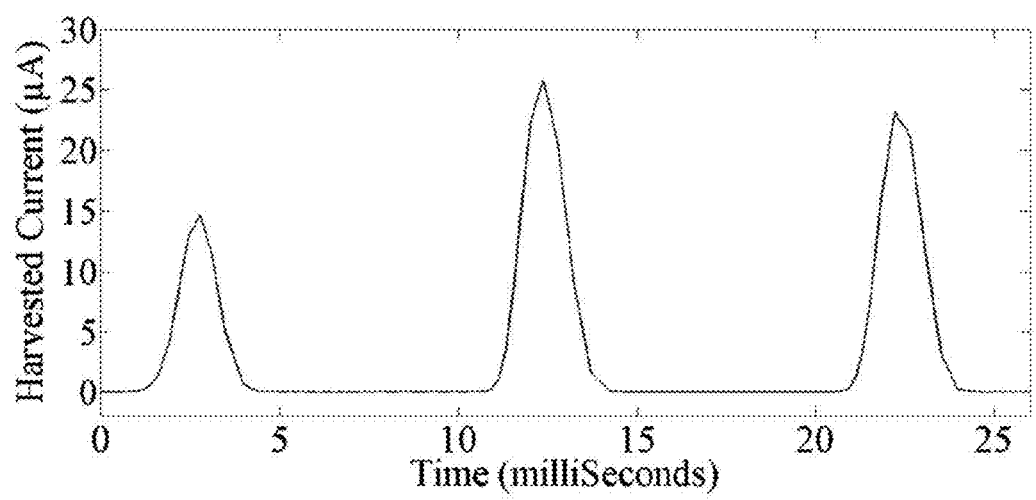

FIGS. 9A-9C are graphs depicting simulated charging of $V_{Store}$ in the charge pump over the first 26 milliseconds of operation with a 350 mV peak input at 100 Hz. The gray highlighted regions indicate periods when the top four charge pump stages charge and boost the DC output voltage. The resulting passive switching voltage that turns on the last PMOS device is indicated. For comparison, a passive diode's turn-on voltage is also indicated. In FIG. 9C, the current charging $V_{Store}$ through the last PMOS stage is shown.

Figure 10:
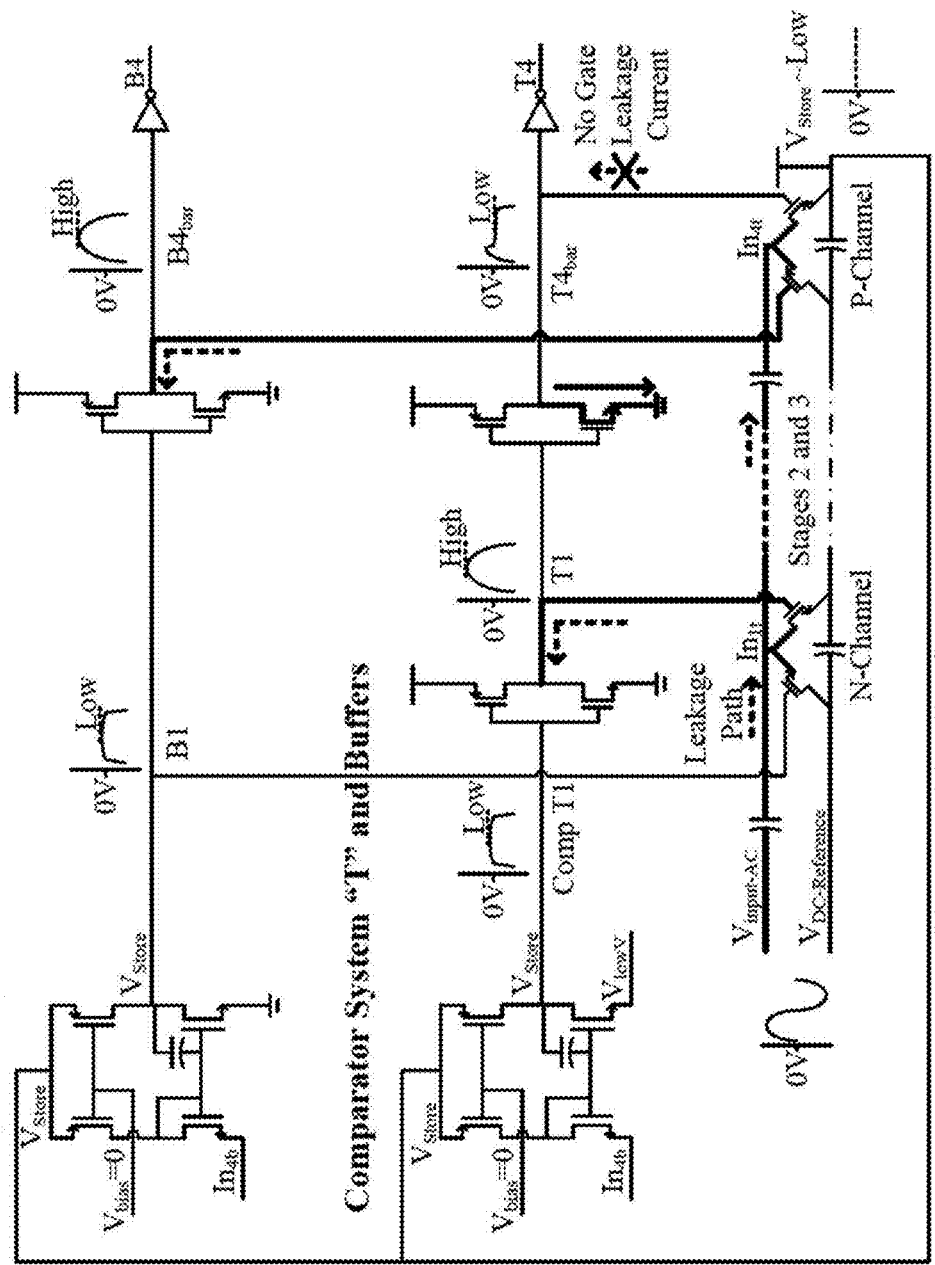
Figure 11:
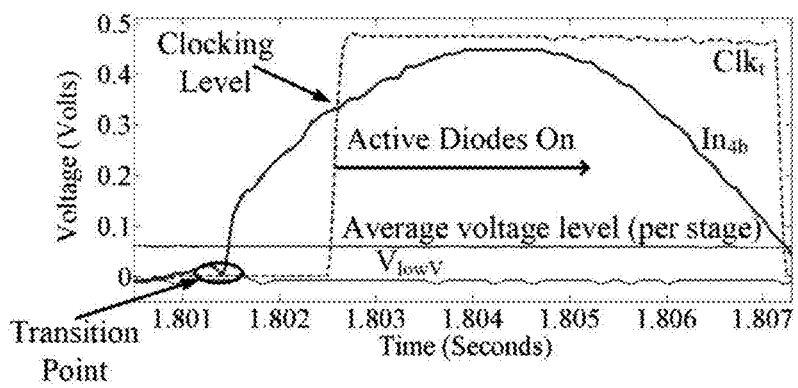

FIG. 10 is a schematic of a portion of the charge pump illustrating the AC input's supply path that produces the passive switching;

FIG. 11 is a graph illustrating startup in the charge pump with a 350 mV input sine-wave generated using a shaker table at 100 Hz and a PFIG coil over a narrow window of time. The key points shown on the diagram include where the comparator should switch based on its inputs (the transition point), the average charging level in the charge pump, and the clocking signal. When $Clk_t$ rises, the active diodes are on, $V_{Store}$ is ~0.5 V so the average charging level per stage is ~60 mV. Due to the system working in subthreshold, there is a delay of ~1 milliseconds after $In_{4b}$ exceeds $V_{lowV}$ before $Clk_t$ rises.

Figure 12A:
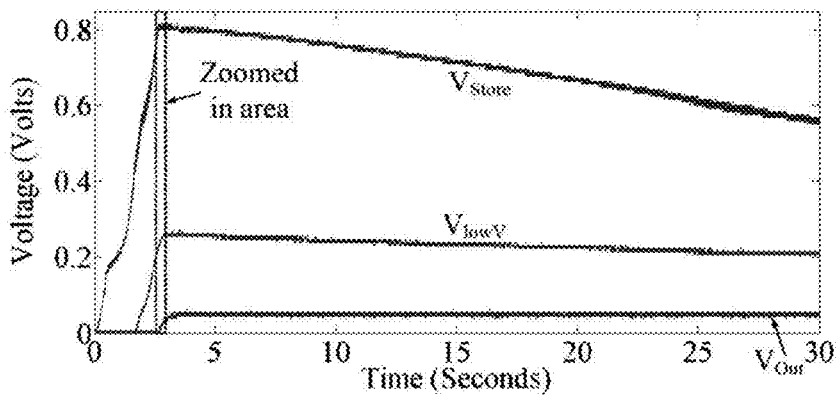
Figure 12B:
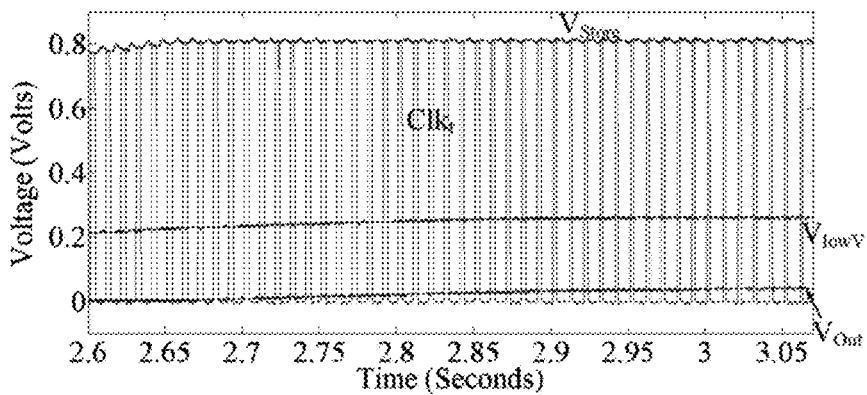

FIGS. 12A and 12B are graphs showing experimentally measured results of the charge pump with a sine-wave generated by a PFIG coil. $V_{Store}$, $V_{Out}$ and $V_{lowV}$ are shown when the mode selector turns on near 0.8 V with a 350 mV sine-wave input. At 0.8 V, $V_{Out}$ and $V_{lowV}$ rise until $V_{Store}$ starts to decrease as charging stalls. IN FIG. 12B, a close up of the failure is shown with $Clk_t$ also plotted. After $V_{Store}$ reaches 0.8 V, the clock pulses become significantly narrower and the active diodes in the N-channel and P-channel stages do not switch. This leads to a decrease in $V_{Store}$.

Figure 13A:
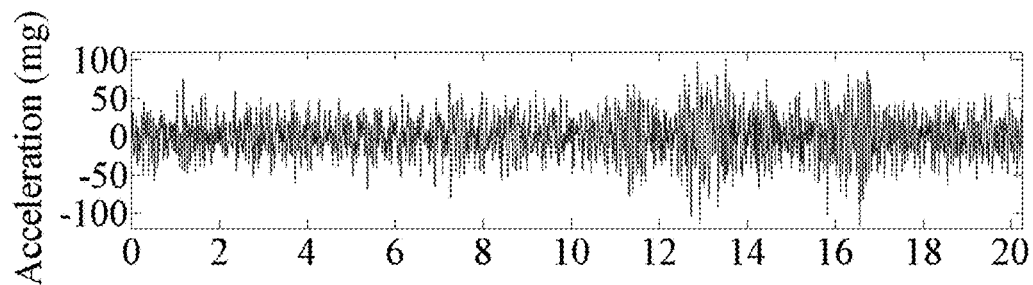
Figure 13B:
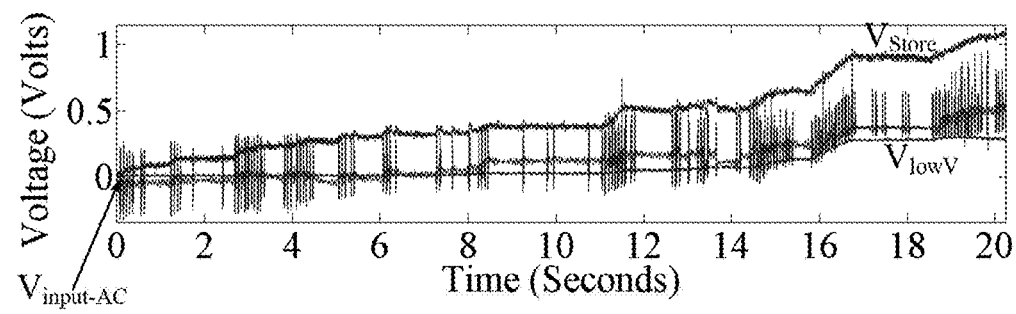

FIGS. 13A and 13B are graphs showing experimentally measured start-up of the charge pump with non-periodic bridge-like vibrations harvested using a PFIG. Measured acceleration, similar to what is seen on a bridge over 20 seconds is shown in FIG. 13A. The accelerations range between 30 and 100 mg. The bursts of acceleration that allow the system to overcome stalling are shaded in gray. The corresponding measured PFIG output into the system along with the circuit voltages $V_{lowV}$ and $V_{Store}$ are shown in FIG. 13B.

Figure 14:
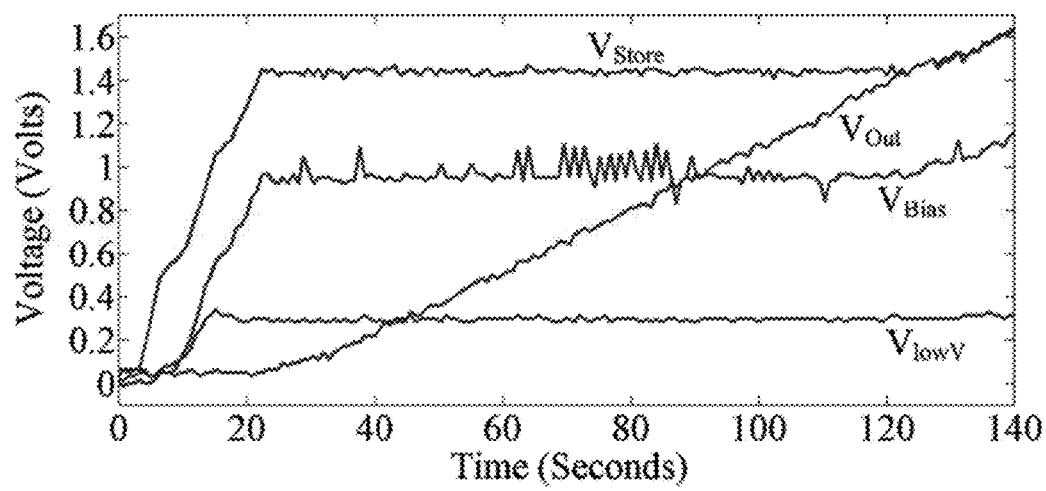

FIG. 14 is a graph showing experimentally measured results with a FIG input signal with a 450 mV peak show the start-up of the system. The lowest voltage stage ($V_{lowV}$), $V_{Bias}$, $V_{Store}$, and $V_{Out}$ are shown. The large storage capacitor on $V_{Out}$ charges once $V_{Store}$ reaches ~1.5 V.

Figure 15A:
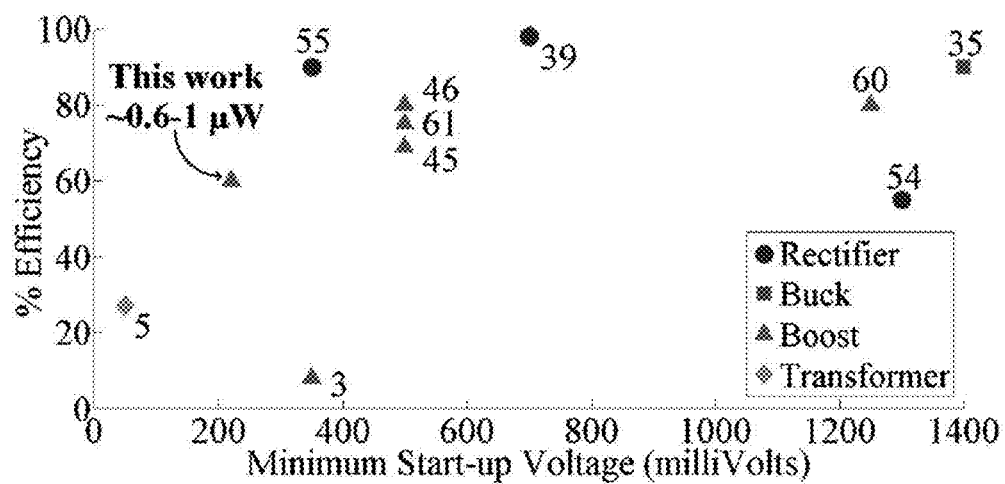
Figure 15B:
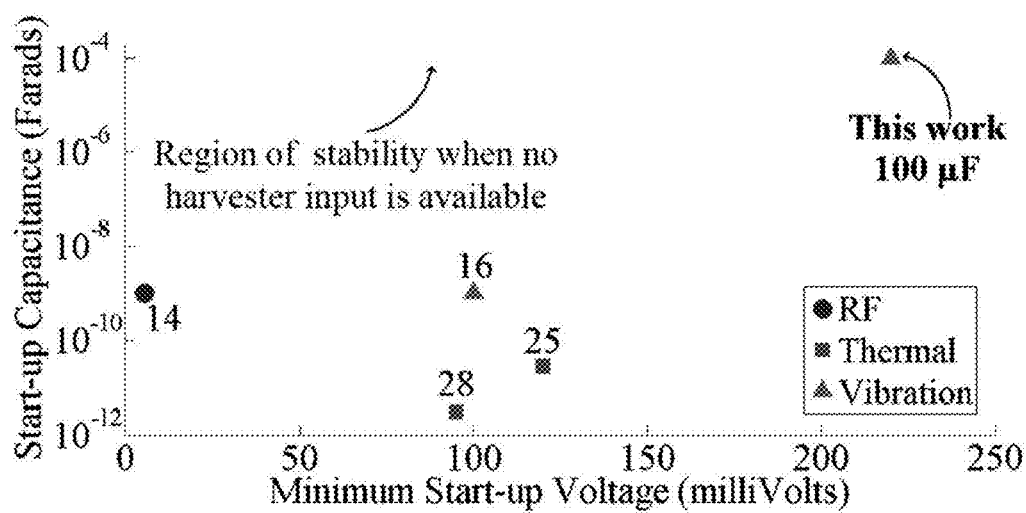

FIGS. 15A and 15B are plots showing a comparison of selected harvester interface circuit research based on minimum start-up voltage for harvested power <~1 mW. Maximum efficiency versus minimum cold start-up for circuits capable of cold start-up without assistance is shown in FIG. 15A. The circuit functioning, whether boosting, rectifying, bucking, or using a transformer is indicated. The presented circuit's efficiency results are reported with a PFIG input. Start-up capacitance versus minimum start-up voltage is shown in FIG. 15B. Selected thermal, RF, and vibration harvesting research is shown to demonstrate the effect of start-up using capacitors ≤1 nF. Indicated in grey is the approximate region where the charge pump output remains stable if the harvester output is temporarily withdrawn.

Corresponding reference numerals indicate corresponding parts throughout the several views of the drawings.

DETAILED DESCRIPTION

Example embodiments will now be described more fully with reference to the accompanying drawings.

Figure 1A:
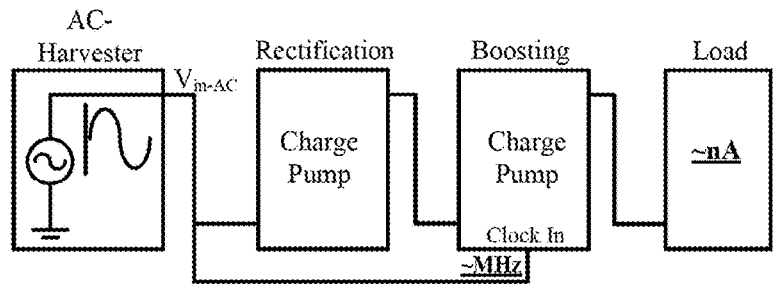
FIG. 1A is a block diagram depicting a scheme for RF harvesting.
Figure 1B:
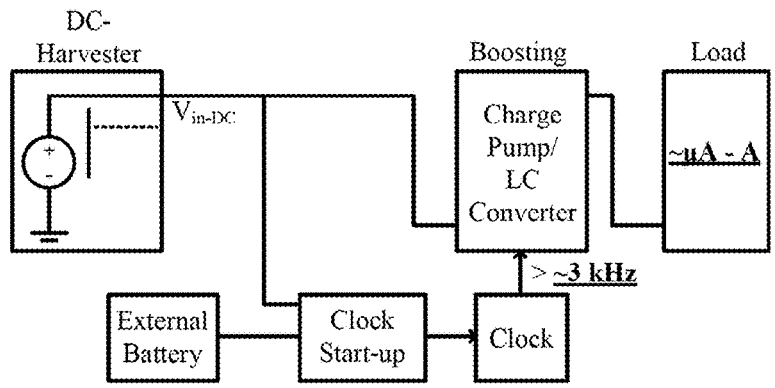
FIG. 1B is a block diagram depicting a scheme for thermal harvesting.
Figure 1C:
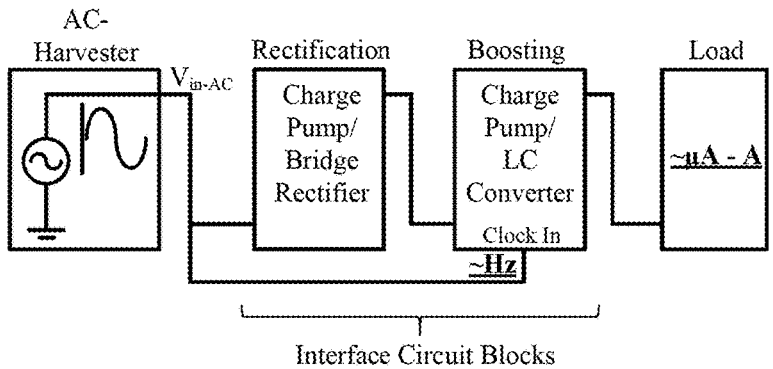
FIG. 1C is a block diagram depicting a scheme for vibration harvesting.
Figure 2A:
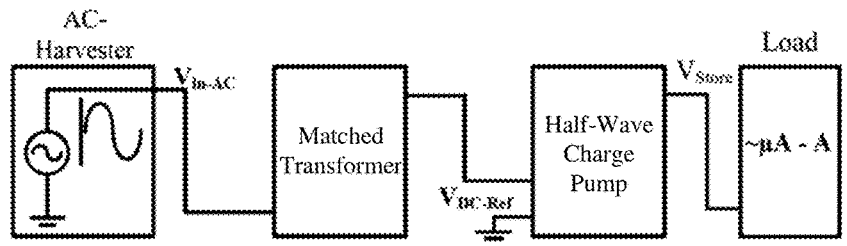
FIG. 2A is a block diagram depicting a harvesting arrangement with a transformer and half-wave two-stage charge pump.
Figure 2B:
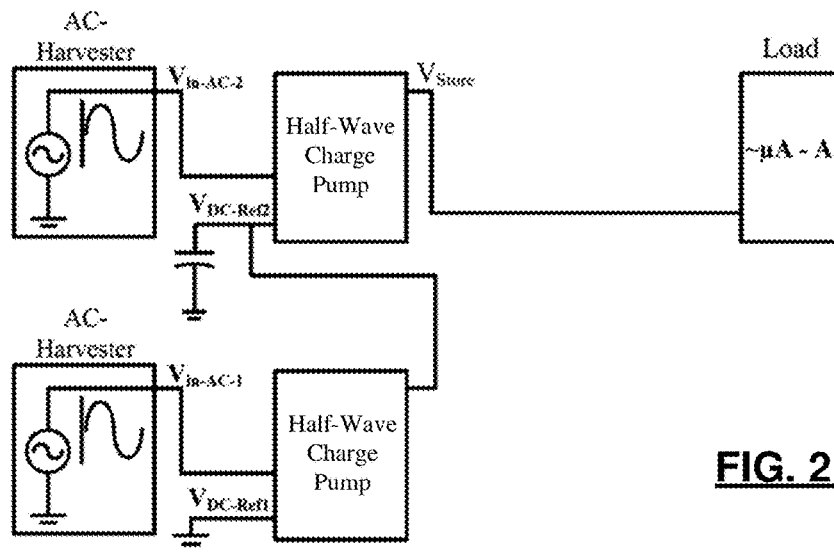
FIG. 2B is a block diagram depicting a harvesting arrangement with two half-wave charge pumps with the output of one charge pump connected to the DC reference of the other charge pump.
Figure 2C:
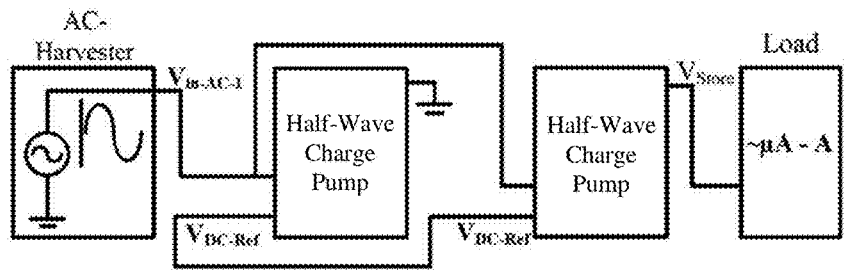
FIG. 2C is a block diagram depicting a harvesting arrangement with two half-wave two-stage charge pump with the DC references of the two charge pumps connected together so that one single input is necessary.
Figure 3:
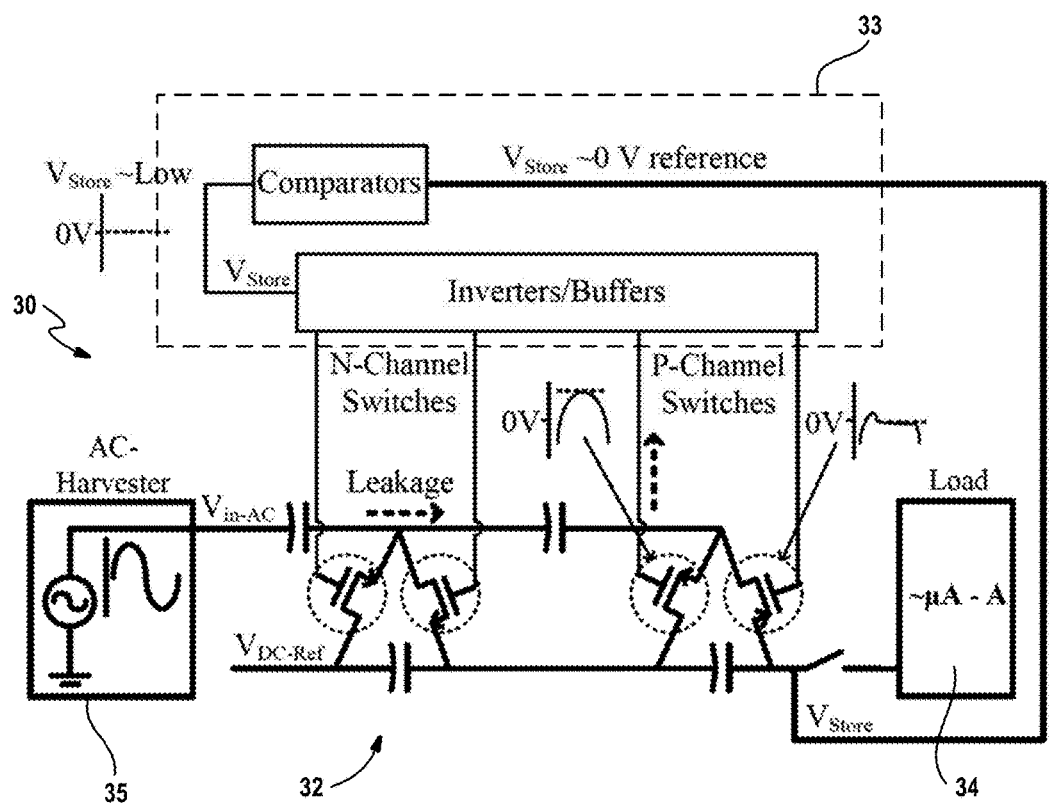
FIG. 3 is a diagram of a charge pump arrangement in accordance with the present disclosure.

FIG. 3 depicts a charge pump arrangement 30 in accordance with the present disclosure. The charge pump arrangement 30 includes a charge pump circuit 32, a switching circuit 33 and an energy storage device 34. The charge pump circuit 32 is configured to receive an input voltage (Vin-$_{Ac}$) and generate an output voltage (V$_{Store}$) whose magnitude is larger than the magnitude of the input voltage. In an example embodiment, the input voltage for the charge pump circuit 32 is received from a vibrational source 35 of power although other AC input sources are contemplated by this disclosure. The energy storage device 34 is configured to receive and store voltage output by the charge pump circuit 32. In the example embodiment, the energy storage device 34 is further defined as a capacitor although other types of energy storage devices are contemplated by this disclosure. In any case, the current used to charge the energy storage device is chosen to be large enough that it will not significantly reduce the turn-on voltage of the transistors in the charge pump circuit below their maximum values. For a capacitor having capacitance of one to 100 nF, the relatively small current needed to charge such a capacitor reduces the effective turn-on voltage of the transistors in the charge pump circuit to about 50 mV; whereas, for a capacitor having capacitance of 100 µF, the larger current needed to charge such a capacitor does not significantly reduce the charge pump circuit turn-on voltage below that of the threshold voltage of the transistors (i.e., 450 mV).

A charge pump is one way to boost and start-up with an AC input because it enables low voltage start-up and high efficiency boosting. In a charge pump, active diodes (or switches) can increase efficiency and decrease minimum functional voltage by significantly reducing the diode's turn-on voltage over passive diodes. To minimize required cold start-up voltage in the presented charge pump 30, passive sub-threshold switching is used. The charge pump circuit 32 is implemented using transistor pairs arranged in successive stages. In FIG. 3, the charge pump circuit 32 has a Cockcroft-Walton arrangement with two stages. Depending upon the implementation, it is readily understood that more stages may be suitable.

During operation, the charge pump output near ~0 volts is used as a reference to enable switching based on the AC input leakage as will be further described below. Through this leakage functioning, AC-DC start-up uses the AC harvester output to form signals which reduce the switches' turn-on voltages, thereby aiding switching. At the same time, the charge pump circuit 32 rectifies and stores the AC harvester's energy. Additionally, it uses the AC harvester output as a clock to switch the transistor pairs in the charge pump circuit 32. Large capacitors (e.g., 100 µF) allow stability to start up with non-periodic inputs.

Figure 4:
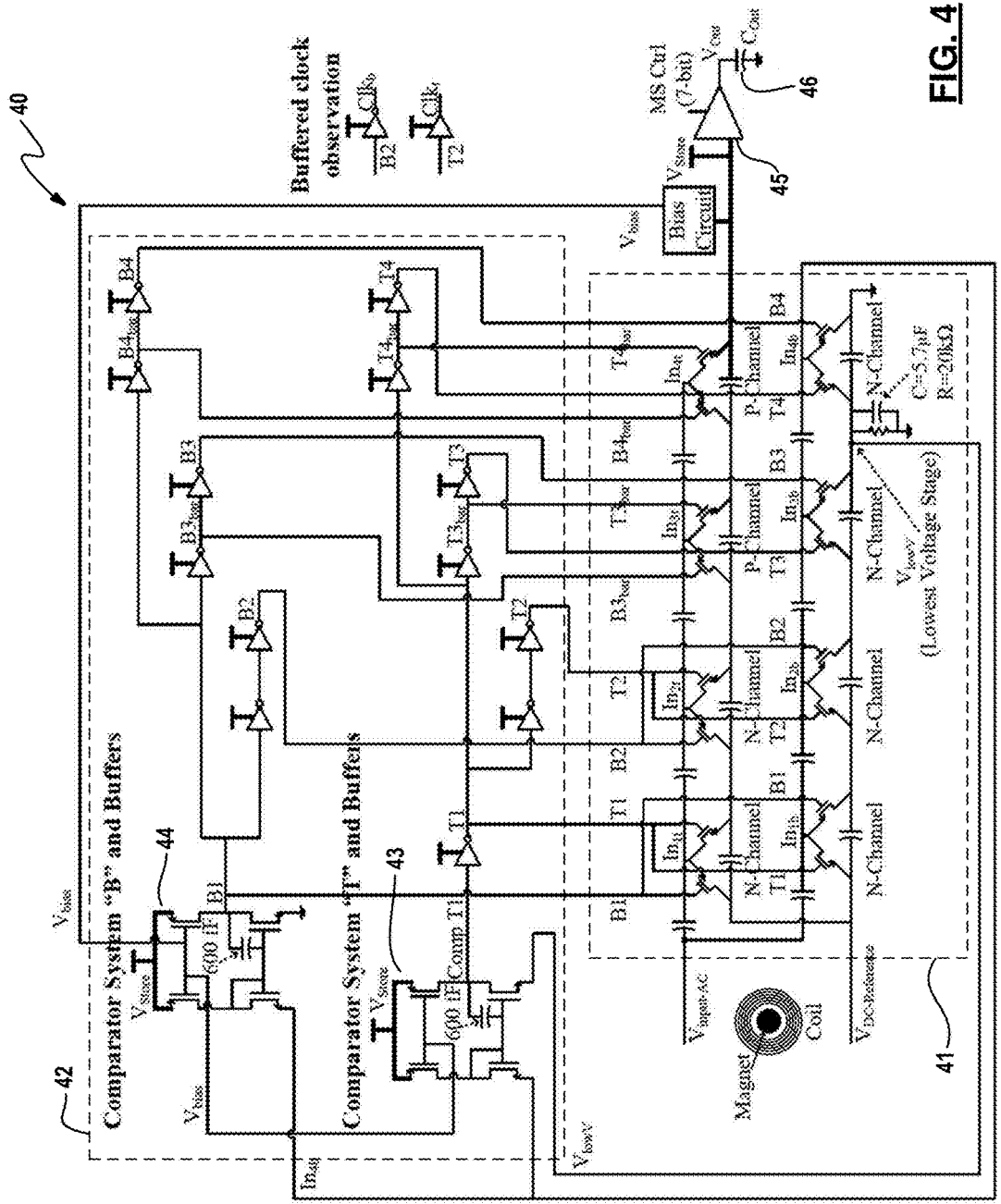
FIG. 4 is a schematic of an example embodiment of a full-wave charge pump with low-voltage startup.

FIG. 4 further depicts an example implementation of a full-wave charge pump 40. In the example implementation, a magnet oscillating through a coil serves as the input source and a capacitor C$_{out}$ having capacitance of 100 microfarads serves as the energy storage device. Again, other types of AC sources with known input impedance are contemplated by this disclosure. Capacitors with a large capacitance (e.g., 10-200 microfarads) are preferred to achieve high efficiency. The full-wave charge pump is fabricated in 180 nm CMOS on a 1.2 mm$^2$ die.

The charge pump circuit 41 is comprised of two half-wave charge pumps (i.e., upper and lower) electrically coupled together, such that output of bottom half-wave charge pump is a DC reference voltage for the top half-wave charge pump. In this example, each half-wave charge pump has a Cockcroft-Walton arrangement with four stages. In order to achieve a desired 1.5 V DC output, a maximum output voltage of twice that is needed, i.e. V$_{out}$>3V. Based on (1) and assuming a 220 mV input and V$_{Active-diode-drop}$ of ~15-20 mV from simulation, the eight stage design with ×2 boosting in each stage optimizes efficiency. Since the output from the parametric frequency increased generator (PFIG) is similar to a decaying sine-wave, a 220 mV peak can be the expected average peak in a PFIG signal with ~400 mV maximum peak. More or less stages are contemplated in other arrangements.

In this example, two stages of the upper (positive) charge pump are comprised of PMOS devices while the remaining stages use NMOS devices. For comparison, discrete conventional charge pumps use both NMOS and PMOS devices in every stage to both align the sources to the DC referenced input and form passive start-up diodes using bulk connections. Placement of PMOS devices in the top stage has the potential for greater harvested current flow. For example, if V$_{Store}$ is ~1 V, a ~1 V difference will overcome the V$_{th}$ in the PMOS devices as their gate is pulled to ground. If NMOS devices are used on the top stage, turning an active diode high to V$_{Store}$ may only result in ~200-300 mV which fails to overcome the >500 mV NMOS V$_{th}$. It is envisioned that the proposed charge pump can start-up with passive switching and does not need passive diodes shorted across its active diodes.

A switching circuit 42 is used to drive the transistors in the charge pump circuit. In FIG. 4, the switching circuit 42 includes two comparators 43, 44. One comparator 43 is configured to receive and compare an input (In$_{4b}$) to a lowest voltage stage of the charge pump circuit 41 with an output (V$_{lowV}$) of the lowest voltage stage of the charge pump circuit; whereas, the other comparator 44 is configured to receive and compare an input (In$_{4b}$) to a lowest voltage stage of the charge pump circuit 41 with ground. In this example, the comparators are implemented as differential to single ended common gate comparators although other types of comparator circuits also fall within the scope of this disclosure.

In saturation, the two comparators 43, 44 and their placement on the lowest voltage stage are well suited for a low voltage input near ground. For example, when In$_{4b}$ exceeds V$_{lowV}$, the voltage on the gates of the NMOS devices in comparator 44 rises which in turn pulls the comparator's output to V$_{lowV}$. With this comparator 44, low voltages near ground switch the comparator 44 without needing to overcome the V$_{th}$ at a gate. In the example implementation, the comparator's PMOS loads are biased by V$_{Bias}$. The V$_{Bias}$ turns on when V$_{Store}$ is equal to V$_{th}$ and stays one V$_{th}$ below V$_{Store}$. If the comparator 44 were used on a higher voltage stage, the comparator 44 would pull its output down to a voltage that is higher than V$_{lowV}$. This voltage may not be low enough to drive the inverter/buffer chain.

Output from the comparators is used to drive the transistors in the charge pump circuit. More specifically, two or more inverters are arranged in series at an output of each comparator. Both the NMOS and PMOS transistors have L=180 nm and W=150 µm (15 fingers of 10 µm). The high W/L ratio was chosen to maximize current flow for a given V$_{gs}$ in saturation (and sub-threshold), but this was balanced with noise on the comparator outputs. With large active diodes, the comparator 44 can turn on the inverters before it is fully on. This in turn loads the harvester output creating feedback in the system, and the corresponding noise increases active power. It is reduced by adding a 600 fF compensation capacitor to the comparator. To verify circuit operation, the buffered top and bottom comparator clocks are sent out to pads.

A mode selector 45 is interposed between the energy storage component 46 and the charge pump circuit 41. The mode selector 45 is configured to receive the output voltage from the charge pump circuit 41. The mode selector 45 operates to pass current from the charge pump circuit 41 to the energy storage component 46 when magnitude of the output voltage exceeds a specific value but blocks the current from the charge pump circuit 41 to the energy storage component when magnitude of the output voltage is below the specific value. In one embodiment, the mode selector 45 prevents current flow to the energy storage component while the DC output voltage of the charge pump circuit is below the threshold voltage of the transistors in the charge pump circuit and permits current flow to the energy storage component while the DC output voltage of the charge pump circuit is above the threshold voltage of the transistors in the charge pump circuit.

Figure 5:
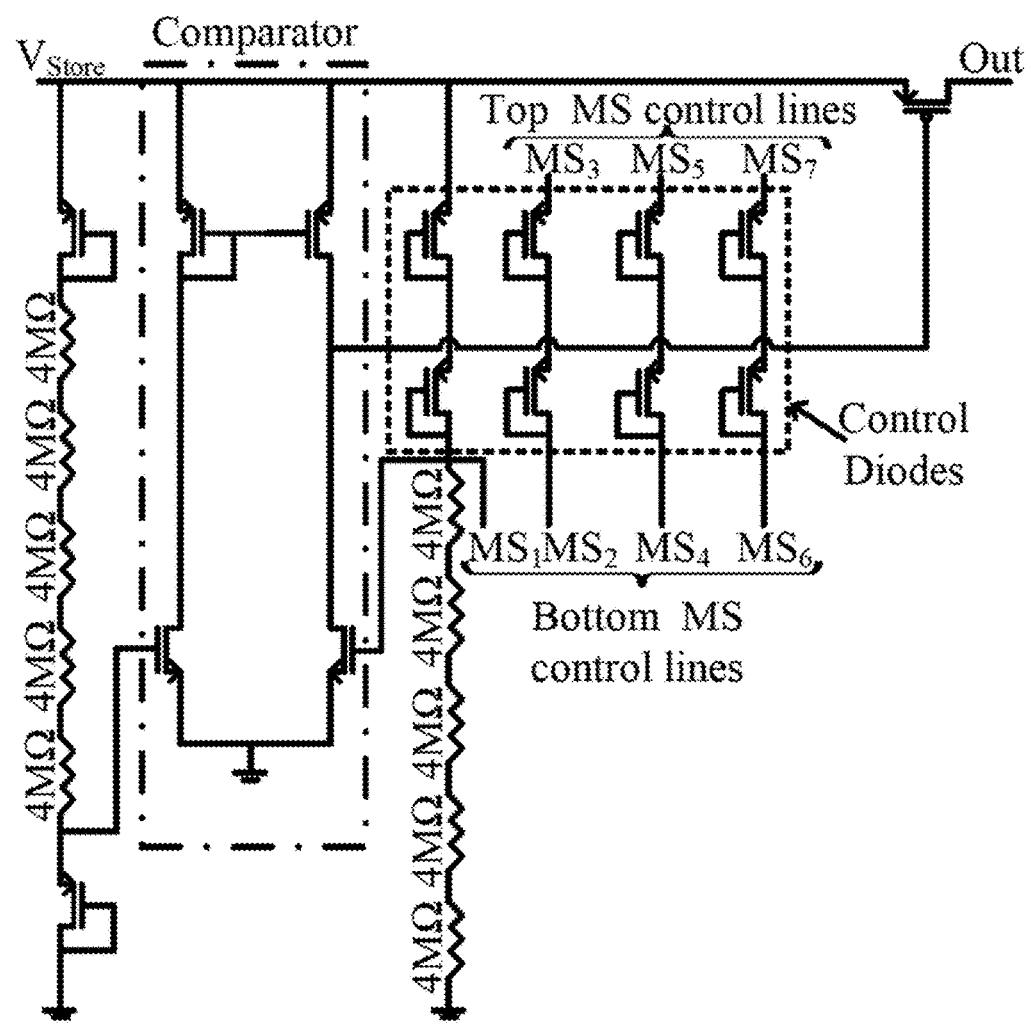
FIG. 5 is a schematic of an example embodiment of a mode selector for use in a charge pump.

FIG. 5 depicts an example implementation for the mode selector. Similar to RF implementations, the mode selector 45 lets current pass when a specific voltage is reached by creating a crossing point between the inputs into a low power comparator. The crossing point is controlled by the non-linear behavior of diodes in the input lines. RF mode selectors use five 5 MΩ resistors in the input lines. Here, low power is maintained by using five 4 MΩ resistors created from 1 μm width high resistance polysilicon forming ~57 μm×~72 μm rectangles. Seven control lines for this mode selector are shown. By connecting or disconnecting these lines, diodes are added or subtracted to adjust the crossing point of the inputs into the comparator to allow charging into $V_{out}$ between 0.8 V and 1.5 V. For example, if $V_{Store}$ and $MS_3$ are connected while $MS_1$ and $MS_2$ are connected, $V_{out}$ charges at a voltage below 1.5 V. It is understood that different crossing points may be configured by connecting or disconnecting the input lines. Other circuits may be used to implement the mode selector functionality. For example, the voltage detecting circuit described in U.S. Patent Application Publication No. 2012/0212212 may be configured for use as a mode selector in a charge pump.

To illustrate circuit functioning and compare start-up to other research, the full-wave charge pump 40 was tested with a periodic sine-wave. Disassembling a PFIG and using a shaker table to oscillate a PFIG-based magnet through a PFIG coil generates a sine wave. This allows easy comparison between sine-wave inputs and non-periodic inputs generated by the PFIG.

Efficiency is used to evaluate this circuit once it is out of sub-threshold. Efficiency is defined as the time-averaged circuit output power divided by the time-averaged maximum harvester power. The harvester's maximum power is the power delivered to a matched load (the coil's resistance) over a full input signal period.

$$\eta = \frac{\frac{1}{t_2 - t_1}\int_{t_1}^{t_2} P_{out-CW}}{\frac{1}{t_2 - t_1}\int_{t_1}^{t_2} P_{out-matched\ load}}. \quad (3)$$

Figure 6:
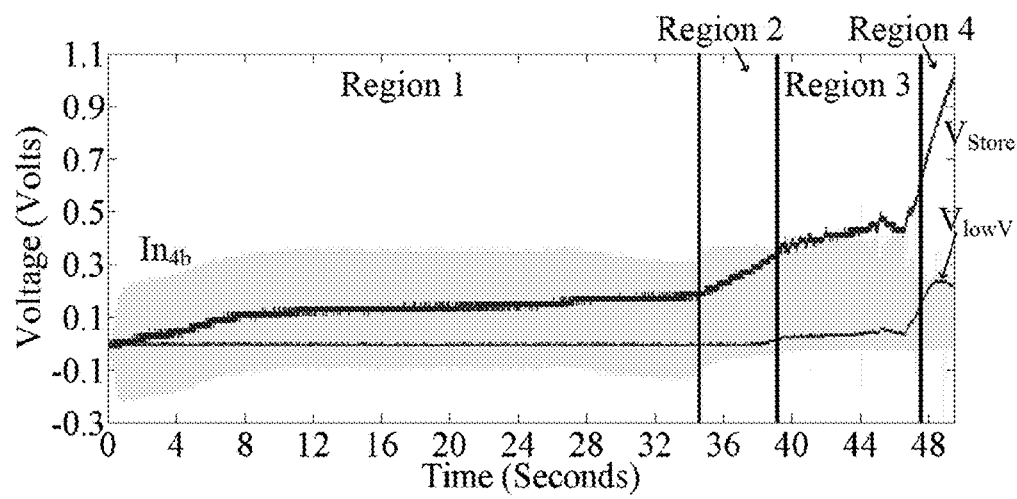
FIG. 6 is a graph illustrating the response of the charge pump to a 220 mV sine wave input.
Figure 7:
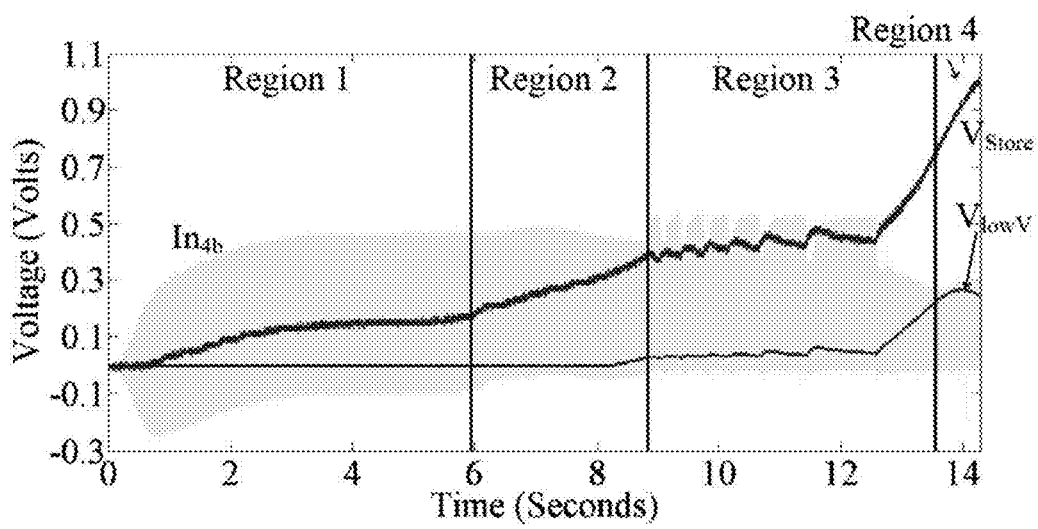
FIG. 7 is a graph illustrating the response of the charge pump to a 280 mV sine wave input.
Figure 8:
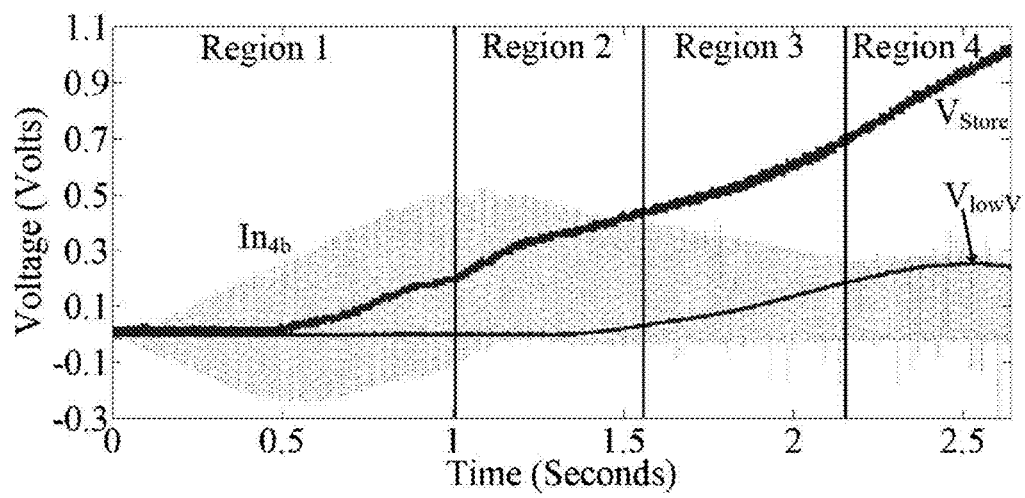
FIG. 8 is a graph illustrating the response of the charge pump to a 350 mV sine wave input.

Based on the behavior and value of $V_{Store}$, the voltage on the output of the charge pump 40, four regions of operation are identified. FIGS. 6-8 show experimental data with a peak differential sine-wave input of 220 mV, 280 mV, and 350 mV, respectively, as well as indicating the four regions of functioning. The first region represents passive functioning from 0 V to 0.25 V where the diodes are driven by leakage-based switching. Next, initial active start-up occurs when the comparators and inverters begin to function near 0.25 V, but the voltage on the lowest voltage stage ($V_{lowV}$) remains near ground. Third, between 0.4 V and 0.9 V, $V_{lowV}$ begins to rise. Here, under certain conditions, it is possible for the rise in output voltage to become stalled. Lastly, as $V_{Store}$ rises above 0.9 V, the output voltage becomes high enough to allow biasing in saturation. In FIGS. 6-8, the input into the comparators, In4b, is initially near its maximum voltage. The interface between the harvester coil and charge pump can be perceived as a voltage divider. This means the circuit equivalent resistance is high during initial start-up, but it decreases as the active diodes turn on.

In Region 1, passive switching on the diode's gates allows start-up from 0 V at voltage levels well below the technology's threshold voltage (e.g. minimum start-up at 220 mV and Vth at ~500 mV). The charge pump 40 uses external 100 μF capacitors charged with peak currents >10 μA from cold start. FIGS. 9A-9C shows this initial passive switching on the top PMOS stage in the charge pump, simulated in Cadence, over the first 26 ms of operation with a 350 mV input at 100 Hz. The input voltage, In4t, into the last PMOS is shown in FIG. 9A. $V_{Store}$ rises from 0 V due in part to the current through the top PMOS diode in the shaded areas when $T4_{Bar}$ is near ground and $B4_{Bar}$ is high turning on and off the charge pump's last stage diodes. FIG. 9A shows how signals Comp T1, B1, and T1 are used to form $T4_{Bar}$ and $B4_{Bar}$, and FIG. 9C shows that the peak harvested currents are as high as 25 μA corresponding to In4t's peak. Even as $V_{Store}$ rises, the passively generated turn-on voltage on the gate of the PMOS diode still goes to ground similar to an active diode. As seen in FIG. 9A, this allows a greater voltage difference and more current flow than if a simple passive diode were between In4t and $V_{Store}$. The PMOS diode (L=180 nm and W=150 μm) will allow some sub-threshold current flow in the ~μA range to initially raise $V_{Store}$ from 0 V. As $V_{Store}$ continues to rise in FIG. 9A, more current charges the energy storage component $C_{out}$ as the PMOS gate voltage is pulled to ground by $T4_{Bar}$.

To form the initial passive switching signals that allow start-up from 0 V, the AC input into the charge pump acts as a supply, rather than $V_{Store}$, through leakage-based operation. Capacitive leakage over temperature and internal circuit leakage that reduces stored charge must be overcome in storage or switches. However, gate leakage from the AC input can be used to passively switch the active diodes. FIG. 10 shows an example of an AC input's bolded supply path to In4t that produces this passive switching in a portion of the full circuit for signals T1, $T4_{Bar}$, B1, and $B4_{Bar}$. Through this CMOS gate leakage, these gate signals tend to follow In4t unless they are pulled low by the outputs of the respective inverters to which they are attached. The initial peak input gate leakage currents are between ~5-20 μA. This current into node $T4_{Bar}$ decreases as $T4_{Bar}$'s voltage goes low when the inverter's NMOS is pulled down by the high voltage (T1) on the gate of the inverter where $T4_{Bar}$ is an output. The input into this inverter, T1, follows In4t high. T1 is able to go high because its inverter's input, CompT1, initially stays low near ground (see, FIG. 9B). Both lowest voltage stage comparators act as references near $V_{Store}$ (initially near ground). The output of the comparators follow $V_{Store}$ because Vbias is at 0 V for initial start-up. Outputs B2-B4 connected to the comparator output B1 through inverters behave similarly to T1-T4 but with opposite voltages because there is not an extra inverter after their comparator. In this manner, the inverters are initially either pulled low or follow the AC input for all PMOS and NMOS stages switching the charge pump.

MOSFET diodes across the active diodes are not used here. Passive diodes created from the bulk connections are available on the PMOS devices but not the NMOS devices. Simulations in FIG. 9 show that significant current only flows through the switches due to the generated passive gate switching during start-up rather than any added diode. Also, extracted simulations show minimal change in start-up characteristics with and without ESD diodes, indicating that the pad's diodes are not responsible for start-up.

Region 2 is sub-threshold Active Functioning (0.25-0.4 V). Unlike active sub-threshold rectifier circuits, the charge pump 40 is designed to charge through sub-threshold rather than function in the sub-threshold regime. Active functioning takes over from passive switching when $V_{Store}$ exceeds ~250 mV. In this region, the voltage on the lowest voltage stage, $V_{lowV}$, stays near 0 V. FIGS. 6 and 7 show that, following the rise of $V_{store}$ to ~250 mV, $V_{lowV}$ stays low for ~2-4 seconds before it begins to rise. This is because the charge pump stage farthest from the input charges last. This architecture uses this uneven charging to aid in start-up. Active diode switching based on the lowest voltage stage comparator, with one input near 0 V, enables a higher Vgs in the comparator. Also, the input near 0 V means more time in a cycle for sub-threshold current to cause the comparators to switch.

FIG. 11 shows an example of the transition point during a small window of time (e.g. after t=1.5 seconds in FIG. 8) during active start-up. The comparators in sub-threshold are set to switch (the transition point) when the input into the lowest voltage stage ($In_{4b}$) exceeds $V_{lowV}$ (near 0 V). This transition point is below the average level of charging throughout the charge pump. FIG. 11 also indicates the "clocking level" when the comparators switch. Switching based on the difference between $V_{lowV}$ and $In_{4b}$ creates a greater $V_{gs}$ in the comparator, minimizing the delay between the transition point and the time when the clock switches. This ~1 ms delay is still large, and it reduces charging. It would be larger if the comparator decisions were not made from the lowest voltage stage. As $V_{Store}$ rises to ~400 mV, $V_{lowV}$ begins to rise and the additional $V_{gs}$ is lost. Start-up to ~400 mV is possible at voltages lower than 220 mV. However, to boost over 1 V, a minimum peak input of 220 mV at ~100 Hz is necessary to overcome stalling in region 3.

Region 3 is mid-level active functioning (0.4-0.9V). As $V_{Store}$ reaches ~0.4 V, the lowest voltage stage begins to rise. Under certain conditions, the rise in $V_{Store}$ can stall here, as explained below. For instance, in FIGS. 6 and 7 $V_{Store}$ has difficulty rising past 0.5 V. The mode selector helps prevents this stalling. The effect on start-up when using a PFIG actuated with non-periodic bridge-like vibrations will also be discussed.

First, consider the case of the mode selector 45 set for ~0.8 V output, with a 350 mV unloaded peak input sinewave. FIG. 12A shows $V_{Store}$, $V_{Out}$, and $V_{lowV}$. The charge pump stalls when $V_{Store}$ reaches 0.8 V; the circuit cannot maintain this value. At this point, $V_{Out}$, attached to a 100 µF capacitor connected to ground, rises to ~0.1 V while $V_{lowV}$ rises to ~0.25 V. The charge pump stalls because $V_{lowV}$ is too high relative to $V_{Store}$. There is not a large enough $V_{gs}$ to pull down the NMOS connected to $V_{lowV}$ in the comparator when $V_{Store}$ is at 0.8 V with the comparator still in sub-threshold. With a 100 µF capacitor attached to $V_{Out}$, $V_{Store}$ cannot rise relative to $V_{lowV}$s rise. In FIG. 12B, a zoomed in view of the stalling shows that as VlowV rises, the clock outputs become narrow. The clock outputs will be unable to properly switch the active diodes, stalling the charging process. Larger active diode transistors (>W=150 µm) would not be able to overcome this stalling due to additional noise (and its power draw) and more of the clocking delay seen in FIG. 11.

Raising the input voltage level will help to avoid stalling. Also, stalling can be avoided by raising the voltage at which the mode selector turns on so that $V_{Store}$ will be higher relative to $V_{lowV}$ during the sub-threshold charging process. In other words, a higher mode selector turn-on voltage keeps the transition point (FIG. 11) low relative to $V_{Store}$ for a longer period during start-up. Similar to a mode selector, thermal harvesting research can prevent connecting to a load until a certain voltage is achieved. However, in the charge pump 40 circuit 100 µF capacitors are still charged from cold start-up rather than only ~pF to ~nF capacitors. Aside from the mode selector, an external capacitor and resistor to ground on $V_{lowV}$ can slow its rise and aid start-up (e.g. R=20 kΩ and C=5.7 µF). A "lock-up" condition is possible here where more voltage is necessary for start-up than originally required if the voltage on $V_{lowV}$ becomes too high during stalling.

This region of operation was examined with the PFIG actuated using both periodic and non-periodic (bridge-like) vibrations. When the PFIG was actuated with a periodic 4.5 Hz input, a minimum peak of 415 mV with average input power of ~9 µW was required for start-up. Start-up is also possible for PFIG actuation with non-periodic bridge-like vibrations. The accelerations applied range between 30-100 mg as seen in FIG. 13A. The open circuit PFIG peak output only occasionally exceeds 415 mV here. All capacitors were discharged before start-up. Measured voltages $V_{Store}$, $V_{lowV}$, and the loaded FIG output are shown in FIG. 13B. With a matched FIG output, the bridge-like acceleration pattern produces ~8.5 µW of circuit output power over 20 seconds. Bursts of higher acceleration PFIG actuations starting near 11 seconds allow $V_{Store}$ to rise past ~0.5 V without stalling. Higher power is only needed during the weak point of start-up (0.4-0.9 V). After this the charge pump is able to transition to full active functioning with high power efficiency.

In Region 4 (i.e., full active functioning (>0.9 V)), once $V_{Store}$ exceeds ~0.9 V, steady-state functioning is possible without stalling. With reference to FIG. 14, $V_{Store}$ stays at ~1.45 V for ~100 seconds as $V_{Out}$ charges from 0 V. There is no stalling because the system is out of sub-threshold, and $V_{Bias}$ is well above ground. In this region, reasonably high efficiency is demonstrated with a PFIG. For a 7.6 µW input from a PFIG actuated at 3 Hz with a peak of 450 mV, the measured circuit efficiency was ~50% ($V_{Out}$>1.2 V).

Various losses decrease efficiency. In (1), optimal efficiency is predicted to be between 200-300 mV. As the FIG output is similar to a decaying sine-wave, perfect optimization for efficiency will not be possible. Rather, the charge pump should be optimized for the average peak voltage. Efficiency losses include active power. Active power was measured with $V_{Store}$ between 1-1.5 V by adding a resistor after $V_{Store}$ to measure ~0.6 µW without PFIG actuation. This power level was verified in simulation where high frequency (10 Hz) PFIG outputs increase power to ~1 µW. Other active boosting circuits give higher efficiencies but consume >5 µW active power. Another source of efficiency loss is that the active diode switching is lined up with only the lowest voltage stage because of small delays through the 100 µF capacitors.

FIGS. 15A and 15B illustrate the charge pump 40 circuit's low voltage boosting start-up, capacitor size, and efficiency results. Cold start-up voltage, this disclosure's focus, is the maximum difference between an input and ground during start-up. The presented circuit's minimum start-up voltage (220 mV) is best when charging >10 µF capacitors without transformers, dual inputs, or a pre-charged supply (FIG. 15A). Transformers matched to a high EM harvester impedance will reduce efficiency. For the charge pump 40 circuit, efficiency of ~50% was measured using a PFIG output with peaks between 200-450 mV. This is higher than using only passive diodes and similar to active boosting research (active power >5 µW). Simpler rectifiers tend to have high efficiency. This presented circuit's start-up voltage is higher than research using ~pF-nF capacitors in vibration, thermal, and RF for start-up (FIG. 15B). The resulting ~pA-nA currents reduce the necessary diode turn-on voltage in these circuits. The orders-of-magnitude larger 100 µF start-up capacitors allow flexibility to charge up with non-periodic harvester outputs by creating a more stable DC supply even if the harvester input is temporarily absent.

Future improvements may allow start-up at lower input voltages by reducing the possibility of stalling and lock-up. For example, diodes formed from CMOS devices could be added across each of the charge pump's active diodes. Also, if VBias could turn on before $V_{Store}$ is at Vth by using a sub-threshold bias generator, the comparators might better function in start-up. Similar ideas possibly apply to thermal harvesting start-up where charge pumps are used.

Few circuit options exist to create a stable supply for vibration harvesting applications with limited harvested power and voltage. The charge pump 40 presented here offers low power (≤~1 µW) rectification and boosting of low voltage (220 mV) AC inputs to ~1-1.5 V DC charging 100 µF capacitors from cold start. The circuit functions as the supply voltage rises from cold start using both unique passive and sub-threshold active functioning without a transformer or pre-charged supply. Periodic and non-periodic inputs generated on a shaker table show the circuit's capabilities.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A charge pump, comprising:
a charge pump circuit comprised of transistor pairs arranged in stages, wherein the charge pump circuit is configured to receive an AC input signal and generate a DC output voltage whose magnitude is larger than magnitude of the AC input signal;
an energy storage device configured to receive and store voltage from the charge pump circuit; and
a switching circuit powered by the AC input signal while voltage stored by the energy storage device is below threshold voltage of the transistors in the charge pump circuit and interfaced with control terminals of the transistors in the charge pump circuit and, in response to leakage current through the transistors in the charge pump circuit resulting from the AC input signal to the charge pump circuit, switches on and off the transistors in the charge pump circuit while voltage stored by the energy storage device is below the threshold voltage of the transistors in the charge pump circuit.

2. The charge pump of claim 1 wherein the switching circuit is powered by voltage stored by the energy storage device while the voltage stored by the energy storage device is above the threshold voltage of the transistors in the charge pump circuit.

3. The charge pump of claim 1 wherein the charge pump circuit has a Cockcroft-Walton arrangement.

4. The charge pump claim 1 wherein the energy storage component is further defined as a capacitor.

5. The charge pump of claim 1 further comprises a vibrational source of power, wherein the input voltage for the charge pump circuit is received from the vibrational source of power.

6. The charge pump of claim 1 wherein the switching circuit includes a comparator and two or more inverters arranged in series at an output of the comparator, wherein the output of the comparator drives the transistors in the charge pump circuit through the two or more inverters.

7. The charge pump of claim 6 wherein the stages of the charge pump circuit successively increase voltage across the stages and the comparator is configured to receive and compare an input to a lowest voltage stage of the charge pump circuit with an output of the lowest voltage stage of the charge pump circuit.

8. The charge pump of claim 7 further comprises a resistor is coupled in parallel with a capacitor and the resistor and the capacitor are coupled directly to the output of the lowest voltage stage of the charge pump circuit.

9. The charge pump of claim 1 further comprises a mode selector interposed between the energy storage component and the charge pump circuit, wherein the mode selector prevents current flow to the energy storage component while the DC output voltage of the charge pump circuit is below the threshold voltage of the transistors in the charge pump circuit and permits current flow to the energy storage component while the DC output voltage of the charge pump circuit is above the threshold voltage of the transistors in the charge pump circuit.

10. The charge pump of claim 1 further comprises a mode selector interposed between the energy storage component and the charge pump circuit and configured to receive the output voltage from the charge pump circuit, wherein the mode selector passes current from the charge pump circuit to the energy storage component when magnitude of the output voltage exceeds a specific value and blocks the current from the charge pump circuit to the energy storage component when magnitude of the output voltage is below the specific value.

11. A full-wave charge pump, comprising:
a charge pump circuit configured to receive an AC input signal and having a plurality of stages with a Cockcroft-Walton arrangement comprised of transistor pairs arranged in stages;
an energy storage device configured to receive and store an output voltage from the charge pump circuit; and
a switching circuit powered by the AC input signal while voltage stored by the energy storage device is below threshold voltage of the transistors in the charge pump circuit and interfaced with control terminals of the transistors in the charge pump circuit and, in response to leakage current through the transistors in the charge pump circuit, switches on and off the transistors in the charge pump circuit while voltage stored by the energy storage device is below threshold voltage of the transistors in the charge pump circuit;

wherein the switching circuit is powered by voltage stored by the energy storage device and switches on and off the transistors in the charge pump circuit while the voltage stored by the energy storage device is above the threshold voltage of the transistors in the charge pump circuit.

12. The full-wave charge pump of claim 11 wherein the charge pump circuit is comprised of two half-wave charge pumps electrically coupled together, such that output of one half-wave charge pump is a DC reference voltage for the other half-wave charge pump.

13. The full-wave charge pump of claim 12 wherein the switching circuit includes a first comparator configured to receive and compare an input to a stage having lowest voltage of the charge pump circuit with an output of the stage having the lowest voltage of the charge pump circuit, and a second comparator configured to receive and compare an input to the stage having lowest voltage of the charge pump circuit with ground.

14. The full-wave charge pump of claim 13 wherein the switching circuit further includes a first string of inverters coupled between an output of the first comparator and select control terminals of the transistors, and a second string of inverters coupled between an output of the second comparator and select control terminals of the transistors.

15. The full-wave charge pump of claim 14 further comprises a resistor-capacitor circuit electrically coupled between the output of the stage having the lowest voltage of the charge pump circuit.

16. The full-wave charge pump of claim 15 further comprises a mode selector interposed between the energy storage component and the charge pump circuit, wherein the mode selector prevents current flow to the energy storage component while the DC output voltage of the charge pump circuit is below a specific voltage and permits current flow to the energy storage component while the DC output voltage of the charge pump circuit is above the specific voltage.

17. The full-wave charge pump of claim 11 wherein the energy storage component is further defined as a capacitor having capacitance of 100 microfarads.

18. The full-wave charge pump of claim 11 further comprises a vibrational source of power, wherein the input voltage for the charge pump circuit is received from the vibrational source of power.

* * * * *